(12) United States Patent
Kikukawa

(10) Patent No.: US 8,009,548 B2
(45) Date of Patent: Aug. 30, 2011

(54) OPTICAL RECORDING MEDIUM

(75) Inventor: Takashi Kikukawa, Tokyo (JP)

(73) Assignee: TDK Corporation, Tokyo (JP)

( * ) Notice: Subject to any disclaimer, the term of this patent is extended or adjusted under 35 U.S.C. 154(b) by 340 days.

(21) Appl. No.: 12/269,199

(22) Filed: Nov. 12, 2008

(65) Prior Publication Data

US 2009/0122693 A1    May 14, 2009

(30) Foreign Application Priority Data

Nov. 14, 2007   (JP) ................................ 2007-295772

(51) Int. Cl.
*G11B 7/24* (2006.01)

(52) U.S. Cl. ....................................................... 369/283

(58) Field of Classification Search .................... 360/283
See application file for complete search history.

(56) References Cited

U.S. PATENT DOCUMENTS

| | | | |
|---|---|---|---|
| 7,138,155 B2 * | 11/2006 | Itoh et al. ........................... | 427/8 |
| 7,321,481 B2 * | 1/2008 | Inoue et al. .................... | 360/135 |
| 7,864,638 B2 | 1/2011 | Watanabe et al. | |
| 2005/0248881 A1 * | 11/2005 | Hayashida et al. ........... | 360/131 |

FOREIGN PATENT DOCUMENTS

| | | |
|---|---|---|
| JP | 2002304730 A | 10/2002 |
| JP | 2006155859 A | 6/2006 |

OTHER PUBLICATIONS

Ichimura et al., "Proposal for a Multilayer Read-only-memory Optical Disk Structure", Applied Optics 45 (8):1794-1803 (2006).
Mishimura et al., "150 GB, 6-layer Write Once Disc for Blu-ray Disc System", SPIE 6282:628201-1-11 (2006).

* cited by examiner

*Primary Examiner* — Mark Blouin
(74) *Attorney, Agent, or Firm* — Porzio, Bromberg & Newman, P.C.

(57) ABSTRACT

An optical recording medium of improved recording and reading characteristics, having both a read-only information recording layer and an information recording layer. The optical recording medium includes information recording layers capable of recording and reading by irradiation of laser light having a wavelength λ of 400 to 410 nm through an optical system having a numerical aperture NA of 0.8 to 0.9. In this medium, the information recording layers include at least a read-only information layer having information recorded in advance and an information recording layer different from the read-only information recording layer, the read-only information recording layer being capable of information recording of write-once type or rewritable type. The read-only information recording layer is stacked closest to a light incident surface of the laser light.

7 Claims, 4 Drawing Sheets

OPTICAL RECORDING MEDIUM

CROSS REFERENCE TO RELATED APPLICATION

This application claims the benefit of Japanese Patent Application No. 2007-295772 filed on Nov. 14, 2007, the disclosure of which Application is incorporated by reference herein.

BACKGROUND OF THE INVENTION

1. Field of the Invention

The present invention relates to an optical recording medium having a plurality of information recording layers that can be recorded and read by the irradiation of laser light.

2. Description of the Related Art

Conventionally, optical recording media such as CD-DAs, CD-ROMs, CD-Rs, CD-RWs, DVD-ROMs, DVD-Rs, DVD+/−RWs, and DVD-RAMs have been widely used to view digital moving image contents and to record digital data. In the meantime, the recording capacity demanded of these types of optical recording media has been increasing year by year. To meet this demand, so-called next-generation optical discs, which are capable of recording large volumes of moving images or data, have come into commercial use. In these next-generation optical discs, the wavelength of laser light used for recording and reading has been shortened to 405 nm in order to increase their storage capacity.

In the Blu-ray Disc (BD) standard, being one of the next-generation DVD standards, for example, the numerical aperture of an objective lens is set at 0.85 in order to record and read up to 25 GB on and from a single recording layer.

The volumes of moving images and data are expected to grow ever greater in the future. Accordingly, studies have thus been undertaken regarding a method for increasing the capacity of an optical recording medium by increasing the number of information recording layers included in the optical recording medium. For BD optical recording media, a technique for achieving an ultra high capacity optical recording medium of 200 GB through the provision of six to eight information recording layers has been proposed (I. Ichimura et. al., Appl. Opt, 45, 1794-1803 (2006); K. Mishima et. al., Proc. of SPIE, 6282, 62820I (2006)).

Further to this, another technique has also been proposed which uses an optical recording medium with a part of its information recording layer designated as a read-only area (hereinafter, referred to as a ROM area) and the remaining part designated as a recordable area of write-once or rewritable type. According to this technique, the ROM area can be utilized to record movie or other contents in advance for the purpose of content playback while the remaining area is used as a recordable area in order to achieve a data-recordable optical recording medium.

With the recent trend toward greater volumes, however, the conventional technique of using one part of the information recording layer as a ROM area and the other part as a recordable area has had the problem in that it is difficult to provide sufficient recording capacities for both the ROM area and the recordable area.

It might be possible to adopt an optical recording medium having information recording layers of multilayered configuration so that a recordable layer and a read-only recording layer are individually stacked in order to avoid a reduction in recording capacity. When forming a multilayered optical recording medium by combining information recording layers of different functions, however, it is difficult to maintain high recording and reading quality for each individual information recording layer. To date, a desirable medium configuration has not been disclosed. In particular, optical recording media having a read-only recording layer are used to play movies and other fixed contents, and therefore are often taken out of the recorder player when the playback of the contents finishes. This has led to the problem that fingerprints and other extraneous tend to adhere to the optical recording media, thereby easily causing a drop in recording and reading quality.

SUMMARY OF THE INVENTION

The present invention has been achieved in view of the foregoing problems. It is thus an object of the present invention to provide an optical recording medium which has a read-only area and can maintain favorable recording and reading quality.

The inventors have made intensive studies and achieved the foregoing object by the provision of the following means.

To achieve the aforementioned object, a first aspect of the present invention is an optical recording medium comprising information recording layers capable of recording and reading by irradiation of laser light having a wavelength $\lambda$ of 400 to 410 nm through an optical system having a numerical aperture NA of 0.8 to 0.9, wherein the information recording layers include at least a read-only information recording layer having information recorded in advance and an information recording layer different from the read-only information recording layer, being capable of information recording of write-once or rewritable type, the read-only information recording layer being stacked closest to a light incident surface of the laser light.

To achieve the aforementioned object, a second aspect of the present invention is the optical recording medium according to the foregoing aspect, wherein the information recording layers are stacked at distances beyond 60 μm from the light incident surface.

To achieve the aforementioned object, a third aspect of the present invention is the optical recording medium according to the foregoing aspects, wherein the read-only information recording layer is stacked within 80 μm from the light incident surface.

To achieve the aforementioned object, a fourth aspect of the present invention is the optical recording medium according to the foregoing aspects, comprising three or more of the information recording layers.

According to the present invention, it is possible to provide the excellent effect of achieving an optical recording medium which includes both a read-only information recording layer and a recordable or rewritable information recording layer, and can maintain high recording and reading quality even when fingerprints and other extraneous adhere to the light incident surface and the like.

BRIEF DESCRIPTION OF THE DRAWINGS

The above and other objects, features and advantages of the present invention will become apparent from the following description and appended claims, taken in conjunction with the accompanying drawings.

DETAILED DESCRIPTION OF THE PREFERRED EMBODIMENTS

Hereinafter, an embodiment of the present invention will be described in detail with reference to the drawings.

Figure 1A:
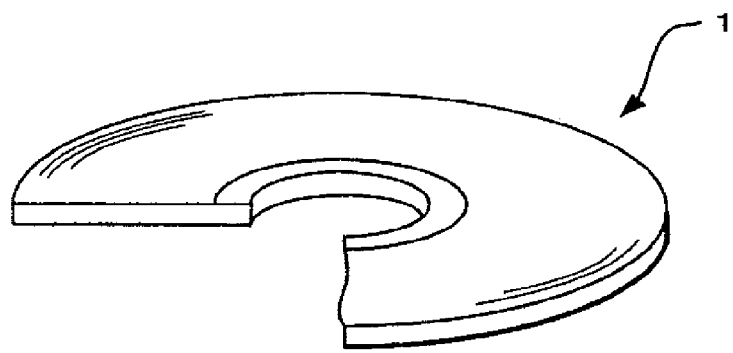
FIGS. 1A and 1B are a perspective view and an enlarged sectional view, respectively, showing an optical recording medium according to an embodiment of the present invention.
Figure 1B:
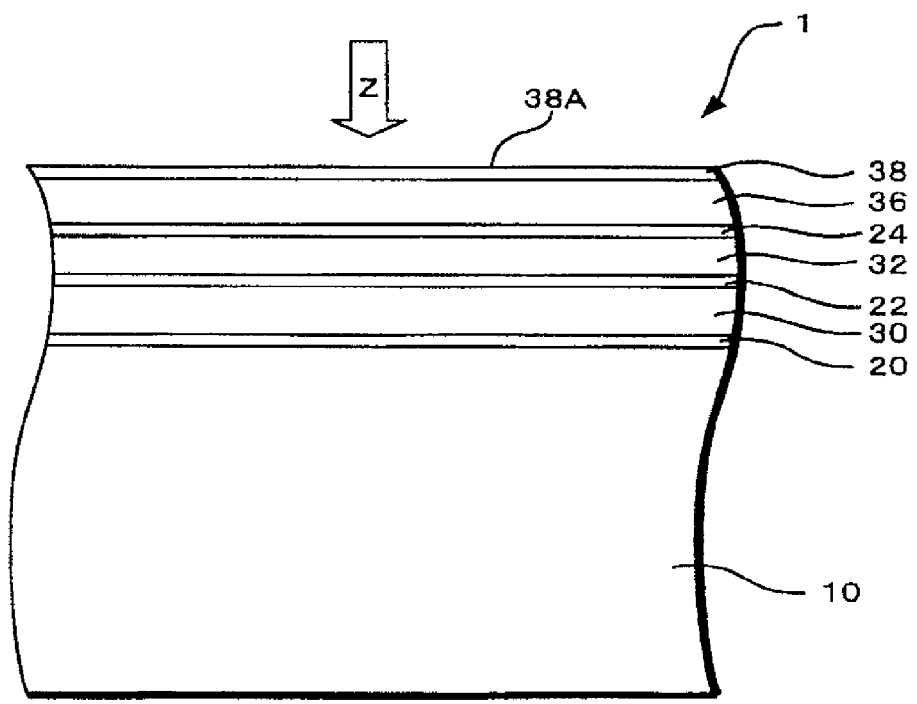

FIG. 1A shows the overall configuration of an optical recording medium 1 according to the embodiment of the present invention. This optical recording medium 1 is a disc-like medium, having an outer dimension of approximately 120 mm and a thickness of approximately 1.2 mm. As shown enlarged in FIG. 1B, the optical recording medium 1 is configured to include a substrate 10, an L0 recordable or rewritable information recording layer 20, a first spacer layer 30, an L1 recordable or rewritable information recording layer 22, a second spacer layer 32, an L2 read-only information recording layer 24, a cover layer 36, and a hard coat layer 38 which are stacked in this order.

The first and second spacer layers 30 and 32, the cover layer 36, and the hard coat layer 38 are all light-transmitting, and transmit laser light that is incident from outside. The laser light Z which is incident on a light incident surface 38A of the hard coat layer 38 can thus be used to record information on the L0 and L1 recordable or rewritable information recording layers 20 and 22 and read information from the L0 to L2 information recording layers 20, 22, and 24.

The L2 read-only information recording layer 24 is the information recording layer lying closest to the light incident surface 38A of the optical recording medium 1. The L0 recordable or rewritable information recording layer 20 is the one farthest from the light incident surface 38A. The information recording layers 20 and 22 have a recording capacity of 30 GB each Note that the information recording layers may have respective different recording capacities.

The substrate 10 is a disc-like member having a thickness of approximately 1.1 mm. The substrate 10 may be made of various materials including glass, ceramic, and resin. A polycarbonate resin is used here. Aside from polycarbonate resins, available resins include olefin resins, acrylic resins, epoxy resins, polystyrene resins, polyethylene resins, polypropylene resins, silicone resins, fluororesins, ABS resins, and urethane resins. Of these, polycarbonate resins and olefin resins are preferable in view of workability and moldability. Grooves, lands, pit rows, or the like, intended for information recording, are formed in/on the substrate 10 at the side of the L0 recordable or rewritable information recording layer.

The L0 and L1 recordable or rewritable information recording layers 20 and 22 and the L2 read-only information recording layer 24 are the layers responsible for storing data. In general, the modes of data storage by information recording layers include a read-only type where data is previously written and cannot be overwritten, and a recordable type where user writing is allowed. The L0 recordable or rewritable information recording layer 20 and the L1 recordable or rewritable information recording layer 22 are of recordable or rewritable type. To be more specific, the data storage mode of recordable type includes a write-once type in which data-written areas cannot be written again, and a rewritable type in which data-written areas can be erased and rewritten with data. Either may be adopted, whereas the present embodiment uses L0 and L1 recordable or rewritable information recording layers 20 and 22 of write-once type.

The L2 read-only information recording layer 24 is of read-only type. That is, data is previously written to the L2 read-only information recording layer 24 in the manufacturing stage.

The first spacer layer 30 is stacked between the L0 recordable or rewritable information recording layer 20 and the L1 recordable or rewritable information recording layer 22, having the function of separating these recording layers from each other. Grooves, lands, or the like intended for information recording are formed in/on the surface at the side of the L1 recordable or rewritable information recording layer 22. The first spacer layer 30 may be made of various materials. As mentioned previously, it has to be made of a light-transmitting material so as to transmit the laser light Z. For example, ultraviolet-curing acrylic resins may be used favorably.

The grooves formed in the substrate 10 and in the first spacer layer 30 function as guide tracks to the laser light Z when recording data on the L0 and L1 recordable or rewritable information recording layers 20 and 22. The energy intensity of the laser light Z is modulated while the laser light travels along the grooves, whereby recording marks are formed in the L0 and L1 recordable or rewritable information recording layers 20 on the grooves.

When the L0 and L1 recordable or rewritable information recording layers 20 and 22 are in the data storage mode of write-once type as in the present embodiment, these recording marks are formed in an irreversible fashion and cannot be erased. If the data storage mode is of rewritable type, on the other hand, the recording marks are formed in a reversible fashion, and can be erased and formed again.

The L1 recordable or rewritable information recording layer 22 in particular needs to include a recording film that has both light transmittance and light-reflecting characteristics. While the above description has dealt with the case where recording marks are formed on the grooves, they may be formed on the lands or both on the grooves and the lands.

The second spacer layer 32 is stacked between the L1 recordable or rewritable information recording layer 22 and the L2 read-only information recording layer 24, having the function of separating these layers from each other. Data bit rows, the read-only contents, are formed on the surface of this second spacer layer 32 at the side of the light incident surface 38A. The spacer layer 32 may be made of various materials. As mentioned previously, it has to be made of a light-transmitting material so as to transmit the laser light Z. For example, ultraviolet-curing acrylic resin may be used favorably.

The L2 read-only information recording layer 24 is made of a so-called reflecting film. In order to irradiate the L0 and L1 recordable or rewritable information recording layers 20 and 22 with a sufficient amount of laser light Z, however, the L2 read-only information recording layer 24 needs to have high light transmittance as well. The L2 read-only information recording layer 24 is thus reduced in thickness so that it has both light transmittance and light-reflecting characteristics.

In this optical recording medium 1, the first spacer layer 30 has a thickness of 17 µm and the second spacer layer 32 has a thickness of 13 µm. Forming the spacer layers 30 and 32 in respective different thicknesses reduces interference between the read signals. Note that the hard coat layer 36 has a thickness of 2 μm, and that the cover layer 36 has a thickness of 68 μm.

As a result, in this optical recording medium 1, the L2 read-only information recording layer 24 is stacked within 80 μm from the light incident surface 38A, and within 75 μm in particular. The L0 and L1 recordable or rewritable information recording layers 20 and 22 are stacked at distances 60 μm far from the light incident surface 38A, and 65 μm in particular. Note that all the information recording layers 20, 22, and 24 are stacked within 110 μm from the light incident surface 38A.

The L0 and L1 recordable or rewritable information recording layers 20 and 22 of recordable type are subject to extraneous on the light incident surface 38A when recording information, and to extraneous on the light incident surface 38A when reading as well. The L0 and L1 recordable or rewritable information recording layers 20 and 22 are therefore susceptible to fingerprints and other foreign substances. Once erroneous information is written to these L0 and L1 recordable or rewritable information rotation recording layers 20 and 22, it is difficult to correct this error when reading or on other occasions afterwards. In contrast, the L2 read-only information recording layer 24 has accurate information recorded at the time of manufacturing, and is thus subjected to extraneous on the light incident surface 38A only when reading. As compared to the L0 and L1 recordable or rewritable information recording layers 20 and 22, the L2 read-only information recording layer 24 is thus less susceptible to fingerprints and other foreign substances. In addition, the foreign substances can be removed to recover the reading quality.

The inventors' studies show that it is possible to suppress the error rates ascribable to adhering fingerprints if information recording layers are located at 80 μm far from the light incident surface 38A, and beyond 100 μm in particular. Information recording layers falling within 65 μm from the light incident surface 38A gradually increase in error rate, however, and tend to exceed the allowable level at 60 μm and less in particular.

Based on the foregoing findings, in the present embodiment the L0 and L1 recordable or rewritable information recording layers 20 and 22 are located as far from the light incident surface 38A as possible while the L2 read-only information recording layer 24 is stacked close to the light incident surface 38A. The present embodiment thereby makes effective use of the thickness direction of the optical recording medium 1 multilayered.

Figure 2:
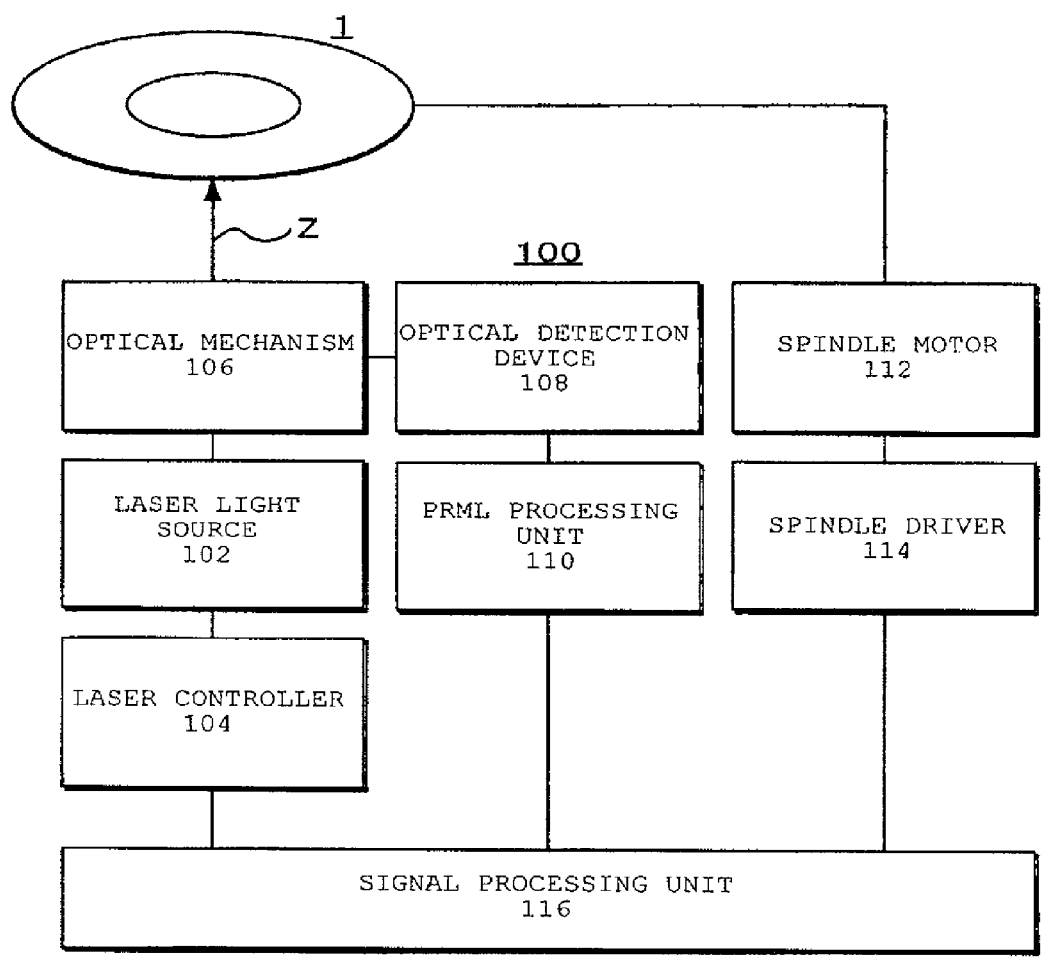
FIG. 2 is a block diagram showing the configuration of an optical recording and reproducing system for recording and reading the optical recording medium.

FIG. 2 shows the configuration of an optical recording and reading system 100 for recording and reading information on/from this optical recording medium 1. This optical recording and reproduction system 100 is configured to include a laser light source 102, a laser controller 104, an optical mechanism 106, an optical detection device 108, a PRML processing unit 110, a spindle motor 112, a spindle driver 114, and a signal processing unit 116. The laser light source 102 generates the laser light Z intended for reading. The laser controller 104 controls the laser light source 102. The optical mechanism 106 guides the laser light Z to the optical recording medium 1. The optical detection device 108 detects reflection of the laser light Z. The PRML processing unit 110 decodes the information detected by this optical detection device 108, based on a PRML detection method. The spindle motor 112 rotates the optical recording medium 1. The spindle driver 114 performs rotation control on the spindle motor 112. The signal processing unit 116 transmits the decoded read data to a CPU (Central Processing Unit) which is not shown in particular.

The laser light source 102 is a semiconductor laser, and generates the laser light Z under the control of the laser controller 104. The optical mechanism 106 includes an objective lens and a polarization beam splitter, and can focus the laser light Z upon an information recording layer as needed. The polarization beam splitter extracts and guides the reflected light from the information recording layer to the optical detection device 108. The optical detection device 108 is a photodetector which receives the reflected light of the laser light Z, converts it into an electrical signal, and outputs the same to the PRML processing unit 110 as a read signal. The PRML processing unit 110 decodes this read signal, and outputs the decoded binary identification signal to the signal processing unit 116.

In this optical recording and reading system 100, the laser light Z has a wavelength λ of 400 to 410 nm. The objective lens of the optical mechanism 106 has a numerical aperture NA of 0.8 to 0.9, and preferably 0.84 to 0.86. More specifically, the wavelength λ of the laser light Z is set to 405 nm, and the numerical aperture NA of the objective lens is set to 0.85. This optical reading block also has a clock frequency f of 66 MHz. Under the rotation control by means of the spindle driver 114, the linear velocity LV of the optical recording medium 1 can be controlled freely to cover the range of 1X (4.1 m/s) to 4X (16.4 m/s).

To perform recording and reading on the optical recording medium 1, the laser light source 102 generates the laser light Z of a predetermined power. The information recording layers of the optical recording medium 1 are irradiated with this laser light Z. When recording, the L0 recordable or rewritable information recording layer 20 or the L1 recordable or rewritable information recording layer 22 is heated by the laser light, whereby recording marks are formed. When reading, the L0 recordable or rewritable information recording layer 20, the L1 recordable or rewritable information recording layer 22, or the L2 read-only information recording layer 24 is irradiated with the laser light Z, and its reflected light is captured through the optical mechanism 106 and is converted into an actual read signal by the optical detection device 108.

As mentioned above, the optical recording medium 1 of the present embodiment has a multilayered structure, including the L0 recordable or rewritable information recording layer 20, the L1 recordable or rewritable information recording layer 22, and the L2 read-only information recording layer 24. The L2 read-only information recording layer 24 is stacked closest to the light incident surface 30A. This makes it possible to reduce recording and reading errors when extraneous such as a fingerprint adheres to the light incident surface 38A.

Specifically, the recording marks of the L2 read-only information recording layer 24 are accurately recorded in advance, in the form of three-dimensional data bits by using a stamper. This can minimize deterioration in reading quality even when extraneous adheres to the light incident surface 38A. That is, this L2 read-only information recording layer 24 can be stacked close to the light incident surface 38A while maintaining high reading quality. This allows effective use of the optical recording medium 1 in the area near the light incident surface 38A. Even in the event of a read failure due to the presence of extraneous, the unreadable state can be resolved simply by wiping this extraneous off.

In contrast, the L0 and L1 recordable or rewritable information recording layers 20 and 22 are subject to extraneous on the light incident surface 38A when recording, and thus have low tolerance to fingerprints and the like. Then, while the L2 read-only information recording layer 24 is put closer to the light incident surface 38A, the L0 and L1 recordable or rewritable information recording layers 20 and 22 are therefore located farther from the light incident surface 38A so as to reduce the effect of fingerprints and the like. As a result, the L0 and L1 recordable or rewritable information recording layers 20 and 22 can maintain high recording and reading quality all the time. Since the L0 and L1 recordable or rewritable information recording layers 20 and 22 of recordable type and the L2 read-only information recording layer 24 of read-only type both are rationally stacked in the optical recording medium 1, it is possible to provide the content read-only function and the information recordable function in a consistent fashion, along with an increase in recording capacity.

In the present embodiment, the L0 and L1 recordable or rewritable information recording layers 20 and 22 are stacked at distances more than 70 μm from the light incident surface 38A. As discussed previously, fingerprints and other extraneous have a greater impact on the BD optical recording medium 1 if the information recording layers are stacked within 70 μm from the light incident surface 38A. Since the L0 and L1 recordable or rewritable information recording layers 20 and 22 having low fingerprint tolerance are located more than 70 μm away from the light incident surface 38A, it is possible to maintain high recording and reading quality.

Meanwhile, in the present embodiment, the L2 read-only information recording layer 24 is stacked within 80 μm from the light incident surface 38A. In other words, this L2 read-only information recording layer 24 is deliberately stacked in the area where the adverse effects of fingerprints and other extraneous on recording and reading are high. It is therefore possible to make effective use of the area that is hard to utilize for the information recording layers of recordable type, by means of the information recording layer of read-only type.

Verification Example

In order to grasp the positions of the information recording layers in the optical recording medium 1 and the recording and reading quality, optical recording media with various information recording layers were read by using the optical recording and reading system 100. A description will be given below.

[Fabrication of Sample Media]

Initially, a substrate was manufactured by injection molding. A spiral groove was formed in the surface of the substrate at a track pitch of 0.32 μm. The substrate was made of polycarbonate resin, with a thickness of 1.1 mm and a diameter of 120 mm.

Next, this substrate was loaded in a sputtering system, and a 48-nm-thick information recording layer was formed over the surface where the groove was formed in.

Specifically, the information recording layer was composed of bismuth (Bi), oxygen (O), and germanium (Ge), with composition ratios (in atm %) of Bi:O:Ge=22:64:14.

Next, the substrate having the information recording layer was loaded in a spin coater. The article was rotated, and an acrylic ultraviolet-curing resin was dripped for spin coating. Subsequently, a light-transmitting stamper having a spiral groove pattern was put against the surface of the spin-coated resin. Through this light-transmitting stamper, the resin was irradiated with ultraviolet rays for curing. After the curing, the light-transmitting stamper was released to obtain a 48-μm-thick cover layer having a spiral groove.

Next, a hard coating agent of ultraviolet/electron beam curable type was applied onto the cover layer by spin coating. The resultant was then heated in the air for 3 minutes to remove the dilute solvent inside the coating, thereby forming an uncured hard coat material layer. A surface material solution was applied to this uncured hard coat material layer by spin coating. This surface material solution was prepared by adding perfluoropolyether diacrylate (0.33 parts by weight, molecular weight: approximately 2000) and 3-perfluorooctyl-2-hydroxypropyl acrylate (0.17 parts by weight) to a fluorine-based solvent (99.5 parts by weight). Then, the hard coat material layer was dried at 60° C. for 3 minutes. By the irradiation of electron beams in a nitrogen gas atmosphere, the hard coat material layer and the surface material solution were simultaneously cured to complete a 2-μm-thick hard coat layer. The electron beam irradiation was performed by using an electron beam irradiator Curetron (from NHV Corporation), with an electron beam accelerating voltage of 200 kV and an irradiation dose of 5 Mrad. The irradiation atmosphere had an oxygen concentration of 80 ppm. In this way, an optical recording medium sample was formed with the information recording layer at 50 μm from the light incident surface.

In the same procedure, the thickness of the cover layer was changed to 58 μm, 68 μm, 78 μm, 88 μm, and 98 μm, so that the distance from the light incident surface to the information recording layer, including the hard coat layer, was 60 μm, 70 μm, 80 μm, 90 μm, and 100 μm, respectively. Consequently, a total of six optical recording medium samples were fabricated.

[Preparation of Artificial Fingerprint]

Next, artificial fingerprints were put on the light incident surfaces 38A of these optical recording medium samples. For the first step to put an artificial fingerprint, the material of the artificial fingerprint was prepared. Fine powders of Kanto loam (0.4 parts by weight), Class 11 (medium particle size: 1.6 to 2.3 μm) of Test powders 1 defined by JIS Z 8901, were mixed and stirred into an artificial fingerprint fluid with triolein (1.0 part by weight) as a dispersion medium and methoxypropanol (10.0 parts by weight) as a diluent.

Next, a master for transferring a pseudo-fingerprint pattern was created. Specifically, the artificial fingerprint fluid was well stirred on a magnetic stirrer, from which approximately 1 mL of the fluid was taken and applied onto a polycarbonate substrate (120 nm in diameter, 1.2 mm in thickness) by spin coating. This substrate was heated at 60° C. for 3 minutes so that methoxypropanol, the unnecessary diluent, was removed completely. This completed the master for transferring a pseudo-fingerprint pattern.

A pseudo-fingerprint transfer member (so-called pseudo-fingertip) was formed by uniformly polishing a No. 1 silicone rubber plug at the smaller end (12 mm in diameter) with #240 abrasive paper (having the performance equivalent to that of JIS AA240 abrasive paper). The polished end of this pseudo-fingerprint transfer member was put against the foregoing master under a load of 4.9 N for 10 seconds, whereby the artificial fingerprint fluid components were transferred to the end of the transfer member. In order to control the amount of adhesion of the artificial fingerprint fluid components in advance, the end of this transfer member was put against different locations of a polycarbonate substrate three times in succession, under a load of 4.9 N for 10 seconds each time.

Being prepared thus, the end of the pseudo-fingerprint transfer member was put against the light incident surface of the hard coat layer of each optical recording medium sample at a location about 40 mm radially from the center, under a load of 29 N for 10 seconds. The artificial fingerprint fluid components were thereby transferred to the light incident surface to form an artificial fingerprint.

[Evaluation of Sample Media]

Using the optical recording and reading system 100, information was recorded on each of the optical recording media having an artificial fingerprint adhering thereto. For recording, the optical recording and reading system 100 was conditioned as follows: the laser light Z with a wavelength λ of 405 nm; the objective lens with a numerical aperture NA of 0.85; the recording clock frequency f of 66 MHz; and the optical recording medium 1 was rotated at a linear velocity LV of 4.1 m/s under the control of the spindle driver 114. Predetermined information was recorded under the following optimum recording power conditions: recording power Pw=8=3 mW; erasing power Pe=3.2 mW; and cooling power Pb=0.1 mw. With these conditions, the information recording layer of the optical recording medium had a recording capacity of 30 GB.

Next, this optical recording medium 1 was read by the optical recording and reading system 100 for quality evaluation. When reading, the optical recording and reading system 100 was conditioned as follows: the laser light Z with a wavelength λ of 405 nm; the objective lens 106A with a numerical aperture NA of 0.85; the optical reading block had a clock frequency f of 64.8 MHz; and the optical recording medium 1 was rotated at a linear velocity LV of 4.03 m/s under the control of the spindle driver 114. The PRML processing unit 110 of this optical recording and reading system 100 was set to a constraint length n=5 (12221).

Figure 3:
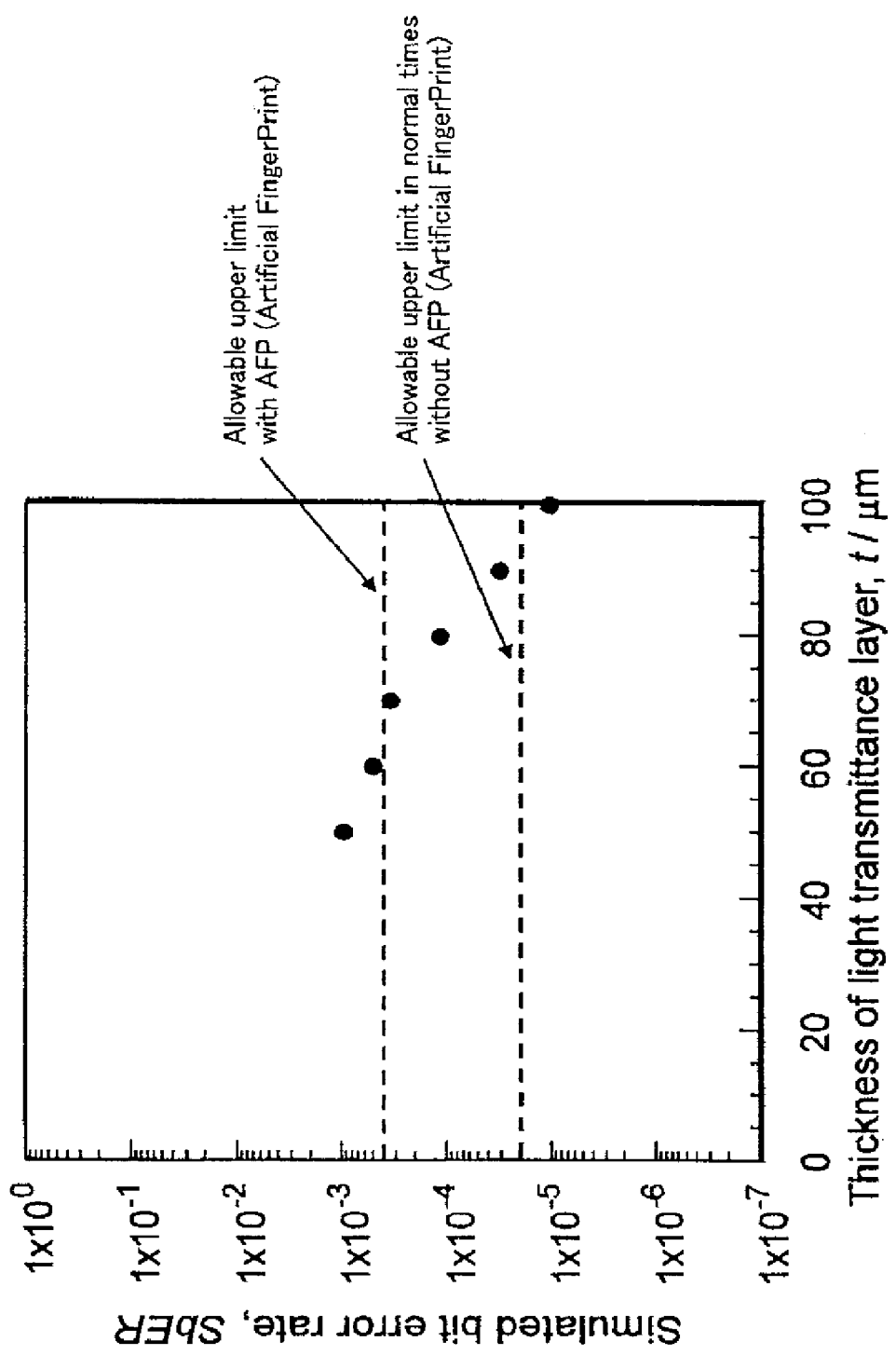
FIG. 3 is a graph showing the relationship between the positions of information recording layers of optical recording medium samples and the error rate in the presence of a fingerprint.

The optical recording and reading system 100 used SbER as the index for evaluating the reading quality SbER (Simulated bit Error Rate) is to evaluate the probability of occurrence of misidentification based on the mean value and standard deviation of a normal distribution that is derived from a plurality of SAM values, the SAM values being calculated for a plurality of read signals. The smaller the SbER value, the higher signal quality it indicates. Here, an SbER measuring unit from Pulstec Industrial Co., Ltd. was used. FIG. 3 shows the evaluations.

As can be seen from the result of the experiment, the information recording layer at approximately 100 m from the light incident surface showed a low error rate despite the adhesion of a fingerprint. The information recording layers falling within approximately 80 μm from the light incident surface showed poorer SbER, exceeding SbER=$2\times10^{-5}$ which is the allowable level in normal times. This meant a deterioration in signal reading quality. When the distance from the light incident surface 38A to the information recording layer fell to or below 65 μm, or 60 μm in particular, SbER exceeded $4\times10^{-4}$ which is the allowable level in abnormal times. The quality deterioration made those information recording layers substantially unusable for recordable type. This shows that the information recording layers of recordable type are preferably stacked at distances more than 60 μm from the light incident surface. In the meantime, the read-only information recording layer is preferably stacked within 80 μm from the light incident surface so as to make effective use of the area that is hardly usable for information recording layers of recordable type.

The present embodiment has dealt only with the case where the optical recording medium has information recording layers of triple-layered structure. The present invention is not limited thereto, however, and may be applied to optical recording media having two layers, or four or more layers. The embodiment has also only dealt with the case where the L0 and L1 recordable or rewritable information recording layers are of write-once type. The present invention is not limited thereto, however. Rewritable type and other information storage modes are also applicable. The information recording layers, if three or more in number, may include two or more read-only information recording layers.

Figure 4:
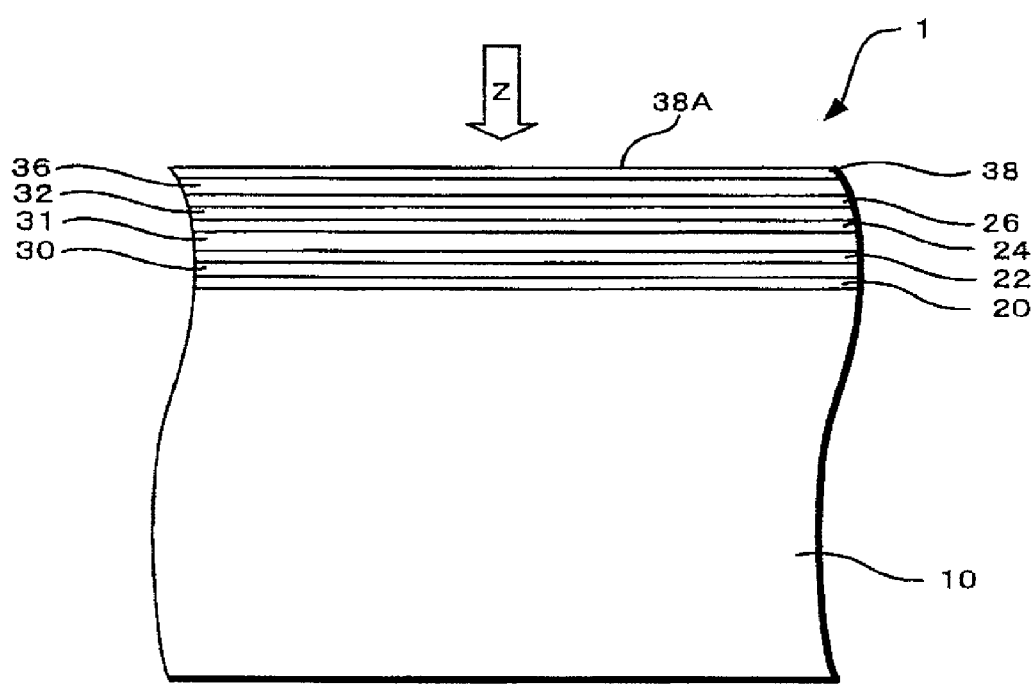
FIG. 4 is an enlarged sectional view showing an optical recording medium according to another embodiment of the present invention.

Suppose now that the optical recording medium 1 has a four-layered structure as shown in FIG. 4. Then, the L0 to L2 information recording layers 20, 22, and 24 are preferably configured as a recordable type such as rewritable type and write-once type, while an L3 read-only information recording layer 26 closest to the light incident surface 38A as a read-only type (ROM type). In this case, the first spacer layer 30 may have a thickness of 13 μm, the second spacer layer 31 a thickness of 16 μm, and a third spacer layer 32 a thickness of 10 μm.

The distances from the light incident surface to the respective information recording layers are not limited to the present embodiment, either. For example, while the present invention has dealt only with the case where all the three information recording layers are stacked within 100 km from the light incident surface, the present invention is not limited thereto. For multilayered configuration, some of the information recording layers may be stacked at 100 μm far from the light incident surface, whereas preferably within 110 μm.

It will be understood that the optical recording medium of the present invention is not limited to the foregoing embodiment, and various modifications may be made without departing from the gist of the present invention.

The present invention is widely applicable to various types of optical recording media that have both a read-only information recording layer and an information recording layer.

The entire disclosure of Japanese Patent Application No. 2007-295772 filed on Nov. 14, 2007 including specification, claims, drawings, and summary are incorporated herein by reference in its entirety.

What is claimed is:

1. An optical recording medium comprising information recording layers capable of recording and reading by irradiation of laser light having a wavelength λ of 400 to 410 nm through an optical system having a numerical aperture NA of 0.8 to 0.9, wherein the information recording layers include at least a read-only information recording layer having information recorded in advance and an information recording layer different from the read-only information recording layer, being capable of information recording of write-once or rewritable type, the read-only information recording layer being stacked closest to a light incident surface of the laser light.

2. The optical recording medium according to claim 1, wherein the information recording layers are stacked at distances beyond 60 μm from the light incident surface.

3. The optical recording medium according to claim 1, wherein the read-only information recording layer is stacked within 80 μm from the light incident surface.

4. The optical recording medium according to claim 2, wherein the read-only information recording layer is stacked within 80 μm from the light incident surface.

5. The optical recording medium according to claim 1, comprising three or more of the information recording layers.

6. The optical recording medium according to claim 2, comprising three or more of the information recording layers.

7. The optical recording medium according to claim 3, comprising three or more of the information recording layers.

* * * * *